(12) United States Patent
Lee

(10) Patent No.: US 11,453,383 B2
(45) Date of Patent: Sep. 27, 2022

(54) HYBRID VEHICLE AND METHOD OF CONTROLLING GEAR SHIFT FOR THE SAME

(71) Applicants: HYUNDAI MOTOR COMPANY, Seoul (KR); KIA MOTORS CORPORATION, Seoul (KR)

(72) Inventor: Jea Mun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 324 days.

(21) Appl. No.: 16/921,438

(22) Filed: Jul. 6, 2020

(65) Prior Publication Data

US 2021/0101582 A1 Apr. 8, 2021

(30) Foreign Application Priority Data

Oct. 7, 2019 (KR) .................. 10-2019-0123667

(51) Int. Cl.
*B60W 20/30* (2016.01)
*B60W 20/40* (2016.01)
*B60W 40/13* (2012.01)
*B60W 40/105* (2012.01)
*F16H 61/02* (2006.01)
*F16H 59/44* (2006.01)
(Continued)

(52) U.S. Cl.
CPC ............ *B60W 20/30* (2013.01); *B60W 20/40* (2013.01); *B60W 40/105* (2013.01); *B60W 40/13* (2013.01); *F16H 59/44* (2013.01); *F16H 59/52* (2013.01); *F16H 59/66* (2013.01); *F16H 61/0213* (2013.01); *B60W 2510/244* (2013.01); *B60W 2520/10* (2013.01); *B60W 2530/10* (2013.01); *B60W 2710/1005* (2013.01); *F16H 2059/663* (2013.01); *F16H 2061/0227* (2013.01)

(58) Field of Classification Search
CPC .......... F16H 59/44; F16H 59/52; F16H 59/66; F16H 2059/663; F16H 61/0213; F16H 2061/0227; B60W 20/30; B60W 20/40; B60W 40/105; B60W 40/13; B60W 2510/244; B60W 2520/10; B60W 2530/10; B60W 2710/1005
See application file for complete search history.

(56) References Cited

U.S. PATENT DOCUMENTS

| | | | |
|---|---|---|---|
| 2004/0079564 A1* | 4/2004 | Tabata | B60L 58/30 |
| | | | 903/910 |
| 2009/0042691 A1* | 2/2009 | Matsubara | B60K 6/383 |
| | | | 477/80 |
| 2018/0093659 A1* | 4/2018 | Fukuda | B60W 20/20 |

* cited by examiner

Primary Examiner — Edwin A Young
(74) Attorney, Agent, or Firm — McDonnell Boehnen Hulbert & Berghoff LLP

(57) ABSTRACT

Disclosed are a hybrid vehicle and a method of calculating driving load therefor for determining a more effective gear shift reference in consideration of a driving mode. The method of controlling gear shift of a hybrid vehicle includes predicting required power of a forward driving path, determining a representative driving mode based on mode switch power as a reference of switch between a first driving mode using only an electric motor and a second driving mode using at least an engine and the predicted required power, and applying any one of a first gear shift map corresponding to the first driving mode based on the determined representative driving mode or a second gear shift map corresponding to the second driving mode.

19 Claims, 8 Drawing Sheets

(51) Int. Cl.
*F16H 59/66* (2006.01)
*F16H 59/52* (2006.01)

FIG. 6A
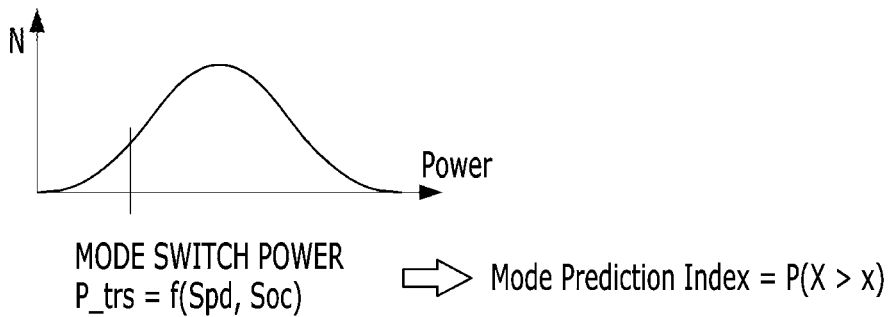
FIG. 6B
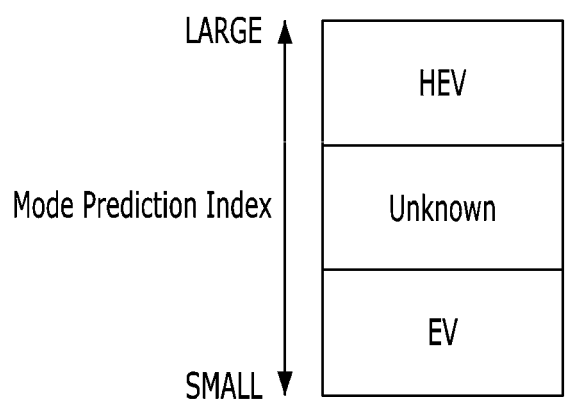
FIG. 6C

HYBRID VEHICLE AND METHOD OF CONTROLLING GEAR SHIFT FOR THE SAME

CROSS REFERENCE TO RELATED APPLICATIONS

This application claims the benefit of Korean Patent Application 10-2019-0123667, filed on Oct. 7, 2019 which is hereby incorporated by reference as if fully set forth herein.

BACKGROUND

Field

The present disclosure relates to a hybrid vehicle and a method of calculating a driving load therefore for determining a more effective gear shift reference in consideration of a driving mode.

Discussion of the Related Art

A hybrid electric vehicle (HEV) is a vehicle that uses two power sources, typically an engine and an electric motor. An HEV has excellent fuel efficiency and engine performance compared with a vehicle having only an internal combustion engine, and is also advantageous for lowering emissions, and thus has been actively developed recently.

Such a hybrid vehicle travels in two modes according to a powertrain used to drive the vehicle. One of the modes is an electric vehicle (EV) mode in which the vehicle travels using only an electric motor, and the other mode is a hybrid electric vehicle (HEV) mode of operating both an electric motor and an engine. A hybrid vehicle switches between the two modes according to driving conditions.

In addition to the aforementioned classification of a driving mode depending on a powertrain, the driving mode is also classified into a charge depleting (CD) mode and a charge sustaining (CS) mode based on a change in a state of charge (SoC) of a battery. In general, a vehicle is driven by driving an electric motor using power of a battery without power of an engine in the CD mode, and power of an engine is used to prevent a battery SoC from being further lowered in the CS mode.

In the case of a general plug-in hybrid electric vehicle (PHEV), the vehicle travels in a CD mode irrespective of a driving load, whether a battery is chargeable, a distance to a destination, or the like, and then, is switched to a CS mode due to depletion of SoC, which will be described with reference to FIG. 1.

FIG. 1 shows an example of the form of mode switch of a general plug-in hybrid vehicle.

In FIG. 1, the horizontal axis is commonly a distance, a vertical axis of an upper graph is a battery state of charge (SoC), and a vertical axis of a lower graph is a driving mode.

Referring to FIG. 1, when a SoC at starting time is higher than a CD/CS reference SoC as a reference for switch between CD and CS modes, a driving mode may be a CD mode, and while the CD mode is maintained, control for continuously reducing an SoC may be performed. In the CD mode, an EV mode is mainly employed for depletion of a SoC, and thus, a gear shift strategy in terms of a motor assumed to be in an EV mode, that is, a gear shift map optimized for an EV mode may be generally used.

When a SoC during traveling is lowered below a CD/CS reference SoC, transition to a CS mode from a CD mode occurs, and in a CS mode, powertrain control is performed at a level of maintaining a preset center SoC (i.e., CS center SOC). Thus, in the CS mode, in order to maintain a SoC, engine driving frequency occurs, and thus, a gear shift strategy in terms of an engine assumed to be in an HEV mode or system efficiency, that is, a gear shift map optimized for an HEV mode is used.

However, the aforementioned gear shift strategy is effective in most situations, but in a situation in which required power greater than output of a motor in a CD mode is generated (e.g., driving on an uphill road with a high slope), switch to an HEV mode frequently occurs, and in a situation in which a low driving load is maintained in an CS mode (e.g., downtown congested section), driving in an EV mode is maintained, and thus, a general corresponding relationship between an CS/CD mode and an EV/HEV is not satisfied. In this case, due to mismatch between an actual driving source and a gear shift strategy corresponding to a current mode, fuel efficiency and efficiency are adversely affected, and fuel consumption while engine driving does not contribute driving force in a switch procedure between EV/HEV depending on a powertrain configuration, that is, non-driving fuel consumption occurs, which will be described with reference to FIG. 2.

FIG. 2 is a diagram for explaining non-driving fuel depletion due to gear shift that occurs in a general parallel type hybrid vehicle.

In FIG. 2, gear shift is assumed to be determined during HEV mode switch in a parallel type hybrid vehicle in which an engine clutch is installed between an engine and an engine clutch.

Referring to FIG. 2, when engine driving is determined during traveling in an EV mode, control is performed to enable an engine speed EngSpeed to follow a motor speed MotSpeed for engagement of an engine clutch. However, when gear shift occurs prior to engagement of an engine clutch, engagement of the engine clutch is delayed and gear shift is previously performed, and thus, it is possible to engage the engine clutch after a time point of terminating gear shift. Thus, fuel is consumed to follow a target engagement speed until gear shift is completed, but such fuel consumption does not contribute driving force, and thus, non-driving fuel depletion occurs.

As a result, when a gear shift map is applied depending on a CD/CS mode, a gear shift map that is not optimized for an actual driving source may be applied. Such incorrect application of the gear shift map causes frequency gear shift, and when frequent gear shift between EV/HEV modes occurs, non-driving fuel consumption is increased.

SUMMARY

Accordingly, the present disclosure is directed to a hybrid vehicle and a method of calculating a driving load therefor for selecting a more effective gear shift strategy.

In particular, the present disclosure provides a hybrid vehicle and a method of calculating a driving load therefore for selecting a gear shift strategy appropriate for an actual driving source during traveling even if a driving mode is determined based on a battery state.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of controlling gear shift of a hybrid vehicle includes predicting required power of a forward driving path, determining a representative driving mode based on mode switch power as a reference of switch between a first driving mode using only an electric motor and a second driving mode using at least an engine and the predicted required power, and applying any one of a first gear shift map corresponding to the first driving mode or a second gear shift map corresponding to the second driving mode based on the determined representative driving mode.

In another aspect of the present disclosure, a hybrid vehicle includes a hybrid controller configured to predict required power of a forward driving path, to determine a representative driving mode based on mode switch power as a reference of switch between a first driving mode using only an electric motor and a second driving mode using at least an engine and the predicted required power, and to determine whether any one of a first gear shift map corresponding to the first driving mode or a second gear shift map corresponding to the second driving mode is applied based on the determined representative driving mode, and a transmission controller configured to apply the gear shift map determined to be applied by the hybrid controller.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6A, 6B, and 6C are diagrams explaining a method of determining a mode prediction index according to an embodiment of the present disclosure;

DETAILED DESCRIPTION

Figure 1:
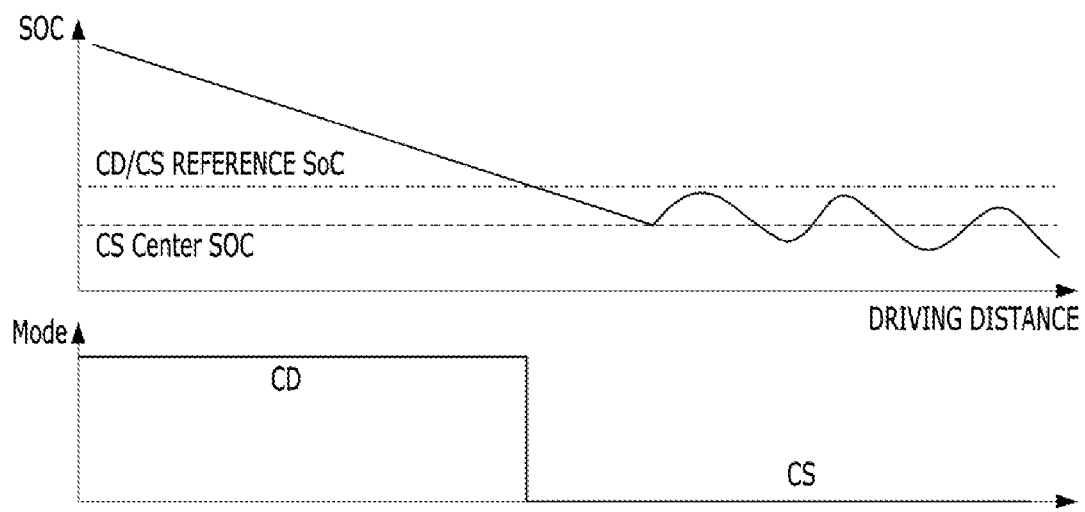
FIG. 1 shows an example of the form of mode switch of a general plug-in hybrid vehicle in the prior art.
Figure 2:
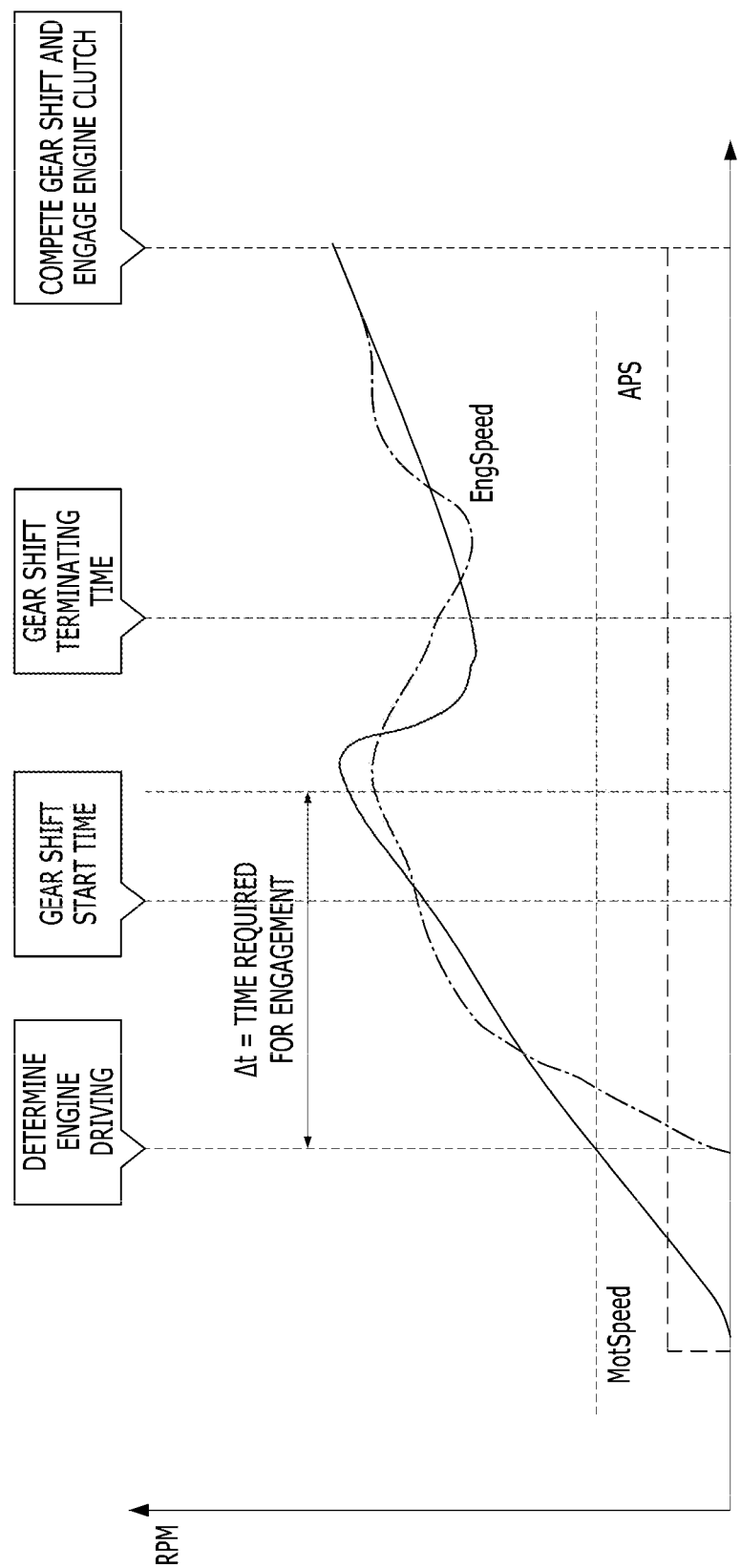
FIG. 2 is a diagram for explaining non-driving fuel depletion due to gear shift that occurs in a general parallel type hybrid vehicle in the prior art.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Prior to a hybrid vehicle and a method of controlling gear shift therefor according to an embodiment of the present disclosure, a configuration and control system of a hybrid vehicle applicable to embodiments will be described.

Figure 3:
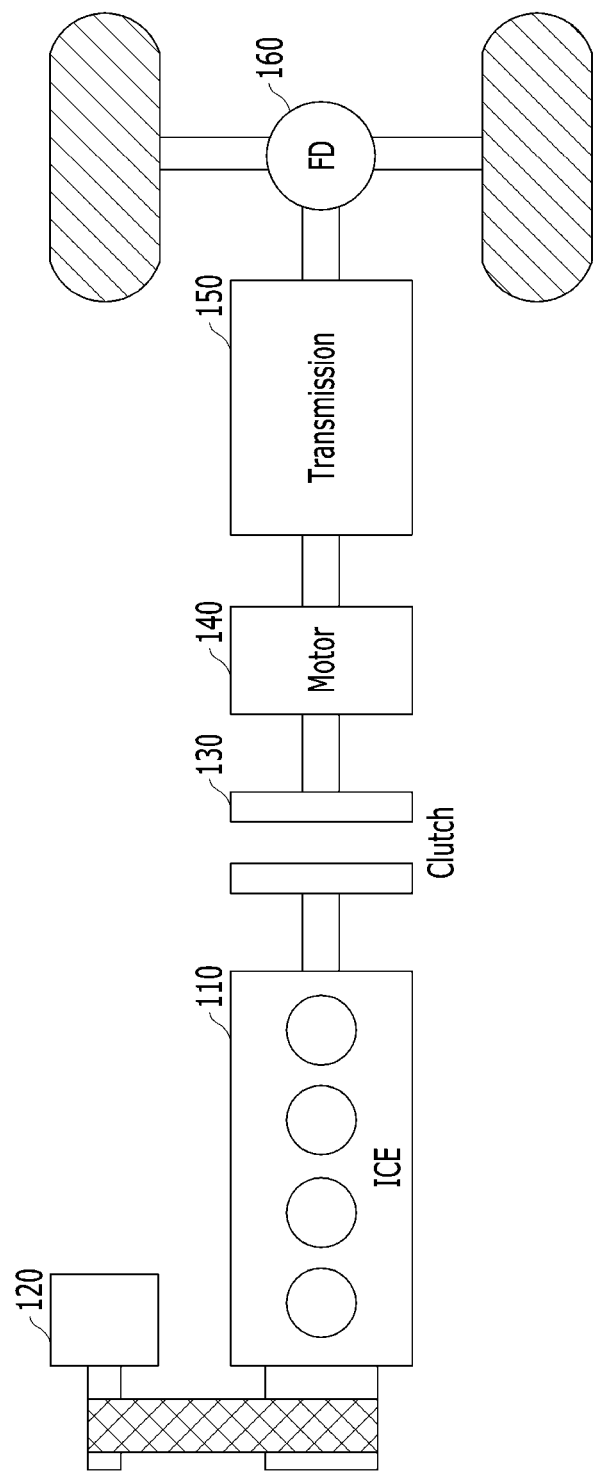
FIG. 3 is a diagram illustrating an example of a powertrain structure of a parallel type hybrid vehicle applicable to embodiments of the present disclosure.

FIG. 3 is a diagram illustrating an example of a powertrain structure of a parallel type hybrid vehicle applicable to embodiments of the present disclosure.

FIG. 3 shows a powertrain of a hybrid vehicle employing a parallel type hybrid system including a driving motor 140 and an engine clutch 130 that are installed between an internal combustion engine (ICE) 110 and a transmission 150.

In such a vehicle, in general, when a driver presses an accelerator after turning on the vehicle, the motor 140 is driven using power of a battery while the engine clutch 130 is opened and transmits power to move wheels through the transmission 150 and a final drive (FD) 160 (i.e., EV mode). As the vehicle gradually accelerates, high driving force is further required and, in this case, a starter generator motor 120 may be operated to drive the engine 110.

Accordingly, when rotational speeds of the engine 110 and the motor 140 are equal to each other, the engine clutch 130 is then engaged such that both the engine 110 and the motor 140 or the engine 110 drive the vehicle (i.e., transition to an HEV mode from an EV mode). When a predetermined engine off condition such as vehicle deceleration is satisfied, the engine clutch 130 is opened and the engine 110 stops (i.e., transition to an EV mode from an HEV mode). In addition, a hybrid vehicle charges a battery by converting driving force of a wheel into electric energy, which is referred to as braking energy regeneration or regenerative braking.

The starter generator motor 120 functions as a starter motor when the engine is turned on and functions as a generator after the engine is turned on or when rotational energy is recovered during engine off and, thus, the starter generator motor 120 may also be referred to as a "hybrid starter generator (HSG)", and depending on the cases, may be referred to as an "auxiliary motor".

Figure 4:
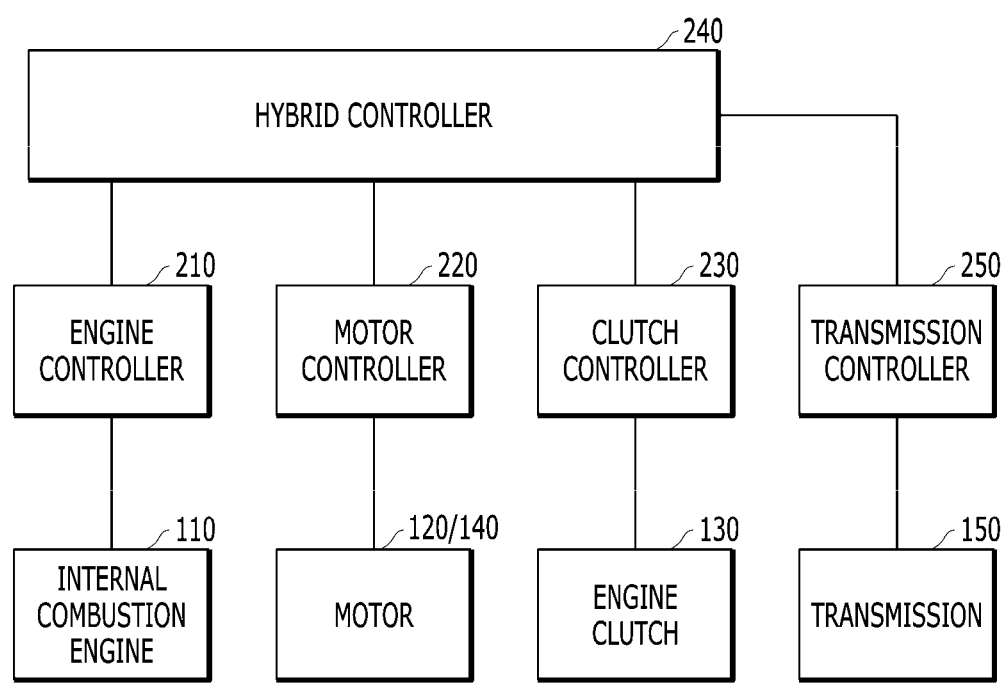
FIG. 4 is a block diagram showing an example of a control system of a hybrid vehicle to which embodiments of the present disclosure are applicable.

A relationship between controllers in a vehicle to which such a powertrain is applied is illustrated in FIG. 4.

FIG. 4 is a block diagram showing an example of a control system of a hybrid vehicle to which embodiments of the present disclosure are applicable.

Referring to FIG. 4, in the hybrid vehicle to which embodiments of the present disclosure are applicable, the internal combustion engine 110 may be controlled by an engine controller 210, torque of the starter generator motor 120 and the motor 140 may be controlled by a motor control unit (MCU) 220, and the engine clutch 130 may be controlled by a clutch controller 230. Here, the engine controller 210 may also be referred to as an engine management system (EMS). In addition, the transmission 150 may be controlled by a transmission controller 250.

Each controller may be connected to a hybrid controller unit (HCU) 240 for controlling an overall operation of a powertrain as a high-level controller in a hybrid vehicle and may provide information required to switch driving modes and to control an engine clutch during gear transmission, and/or information required to control engine off to the HCU 240 or may perform an operation according to a control signal under control of the HCU 240.

In more detail, the HCU 240 may determine whether a mode is switched depending on a driving state of a vehicle. For example, the hybrid controller may determine an open time of the engine clutch (EC) 130, and may control hydraulic pressure (in the case of a wet EC) or control torque capacity (in the case of a dry EC) when the EC is opened. The HCU 240 may determine an EC state (lock-up, slip, open, etc.) and may control a time for stop of fuel injection of the engine 110. The hybrid controller may transmit a torque command for control of torque of the starter generator motor 120 to the MCU 220 and may control engine rotational energy recovery. In addition, the HCU 240 may control a low-level controller for determining and switching a mode when driving mode switch is controlled.

Needless to say, it should be understood that the aforementioned relationship between the controllers and functions/divisions of the controllers are exemplary and, thus, are not limited to the terms. For example, the HCU 240 may be embodied by allowing any one of other controllers except for the HCU 240 to provide a corresponding function or two or more of other controllers may distribute and provide the corresponding function.

The aforementioned configuration of FIGS. 3 and 4 is merely an example of a configuration of a hybrid vehicle, and it should be understood that a hybrid vehicle applicable to embodiments of the present disclosure is not limited to this configuration.

Hereinafter, control of gear shift strategy according to embodiment of the present disclosure will be described based on the aforementioned configuration of a hybrid vehicle.

According to proposal of an embodiment of the present disclosure, a ratio of employing EV and HEV modes may be predicted by predicting a driving load based on forward path information, and gear shift control may be applied depending on the predicted ratio.

According to an embodiment, the application of a predicted ratio to gear shift control may mean that a gear shift map optimized for efficiency of an electric motor is applied in a section in which a ratio of employing an EV mode is high and that a gear shift map optimized for engine or system efficiency is applied in a section in which a ratio of employing an HEV mode is high.

According to an embodiment, when it is not possible to predict a ratio of an EV mode or an HEV mode or in a specific range, a gear shift map may be matched with a driving mode (i.e., CD/CS mode) based on a SoC.

A gear shift map corresponding to an EV mode may be set to maintain a specific RPM period range (e.g., 3000 to 4000 RPM) in which the motor 140 has optimum efficiency, and may be set to maintain a specific RPM time range (e.g., 1500 to 2500 RPM) in which the engine 110 has optimum efficiency, but the present disclosure is not limited thereto.

Each of a gear shift map corresponding to an EV mode and a gear shift map corresponding to a HEV mode may include a plurality of gear shift lines depending on a vehicle speed and an accelerator pedal sensor (APS) value, and may be provided with respect to each of gear shift to a upper gear stage and gear shift to a lower gear stage, but the present disclosure is not limited thereto.

Figure 5:
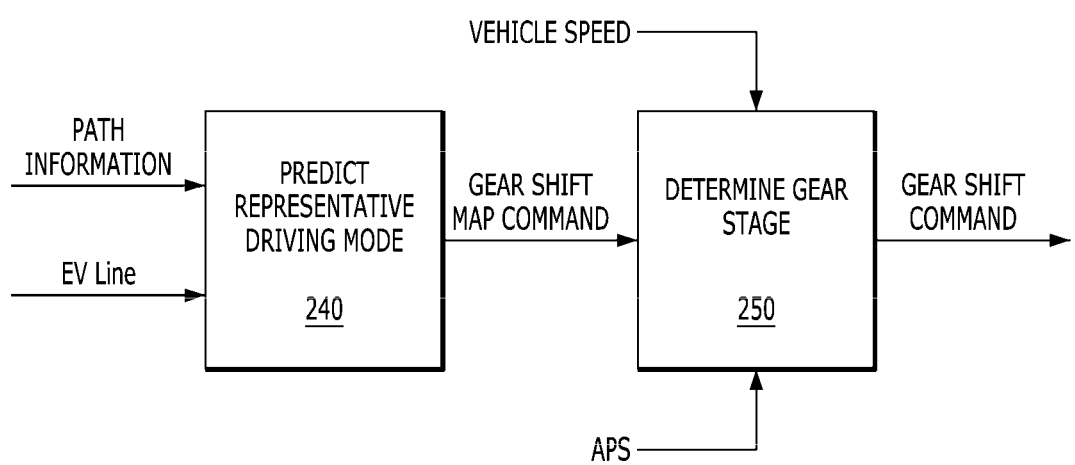
FIG. 5 is a diagram for explaining a concept of gear shift control according to an embodiment of the present disclosure.

First, gear shift control according to an embodiment will be described in terms of a control system with reference to FIG. 5. FIG. 5 is a diagram for explaining a concept of gear shift control according to an embodiment of the present disclosure.

Referring to FIG. 5, the HCU 240 may predict a representative driving mode based on path information and an EV line as switch reference power (or reference torque) between an EV mode and a HEV mode, and may transmit a gear shift map command indicating application of a gear shift map corresponding to the predicted representative driving mode among the gear shift map corresponding to the EV mode and the gear shift maps corresponding to the HEV mode, to the transmission controller 250.

The transmission controller 250 may determine a gear stage appropriate for a current driving situation by applying a vehicle speed and an accelerator pedal sensor (APS) value to the gear shift map corresponding to the gear shift map command and may transmit a gear shift command to the transmission 150.

Here, the EV line may be value pre-retained in the HCU 240 or a value that is dynamically set by the HCU 240 in consideration of a vehicle speed, a SoC of a battery, or the like.

In addition, the path information may be acquired from a navigation system (not shown) and may include at least one piece of information required to calculate required power depending on a driving load. For example, the path information may include information on a road configuration and a road situation to a destination. Information on the road configuration may include at least one of a road type, a slope of a road, a speed limit, curve information, or a section length, and the information on the road situation may include at least one of a congestion degree, an average vehicle speed, whether an accident occurs, or real-time signal information, but the present disclosure is not limited thereto. Here, the destination is not necessarily explicitly set. For example, the destination may be directly set by a driver, may be autonomously set by a navigation system in consideration of big data learning or statistics or driver habit, or may be forward position at a predetermined distance from a current position in consideration of going straight.

According to an embodiment, the HCU 240 may predict required power for each section in order to determine the representative driving mode and may perform indexing on the predicted required power with respect to ratios of EV mode driving and HEV mode driving. Here, the section may be a unit obtained by segmenting a predicted forward driving path, and a reference for segmentation may be determined in consideration of a least one of a section length, a road type, a speed limit, an average vehicle speed, or a gradient change, but the present disclosure is not limited thereto.

A method of predicting required power of the HCU 240 may include a method using dynamics and a method using statistics, and an indexing method may be different depending on each method, which will be described with reference to FIGS. 6A-6C.

FIGS. 6A-6C are diagrams explaining a method of determining a mode prediction index according to an embodiment of the present disclosure.

First, referring to FIG. 6A, predicted required power P_pred with respect to a current section using dynamics may be acquired as a function of a vehicle mass Mass, an average vehicle speed Spd_Navi, and an average slope Slope_Navi of a current section, acquired from a navigation system.

The EV line, i.e., the mode switch power P_trs may be acquired as a function pre-determined depending on a vehicle speed Spd and a battery state of charge (SoC).

The mode prediction index may be calculated based on a difference P_pred−P_trs between the predicted required power P_pred and the the mode switch power P_trs that are calculated above. In this case, the mode prediction index may be directly proportional to the difference or may be quantized in some sections.

For example, it may be seen that, as a mode prediction index is increased, a ratio of HEV mode driving in a corresponding section may be increased and that, as the mode prediction is reduced, a ratio of EV mode driving in the corresponding section may be lowered.

Next, referring to FIG. 6B, when the HCU 240 accumulates and collects information on required power for each period characteristics (e.g., average vehicle speed and slope), the HCU 240 may statistically predict required power in a similar period to a current section. In detail, based on a position of the current mode switch power P_trs in statistics of required power in a similar section to the current section, the HCU 240 may convert the possibility that higher required power than the current mode switch power P_trs is generated into a mode prediction index.

When the mode prediction index is determined, the HCU 240 may determine a representative driving mode based on the determined mode prediction index. To this end, the HCU 240 may refer to a reference for determining a preset representative driving mode as shown in FIG. 6C. In detail, an HEV mode may be determined as a representative driving mode with respect to a mode determination index range (i.e., HEV mode range) with a relatively high value, and an EV mode may be determined as a representative driving mode with respect to a mode determination index range (i.e., EV mode range) with a relatively low value. In addition, a mode determination index range between an HEV mode range and an EV mode range may be set as an unknown range.

When the determined mode prediction index corresponds to an unknown range, the HCU 240 may determine a representative mode based on a SoC. For example, the HCU 240 may determine an EV mode as the representative driving mode when a current SoC is greater than a preset CD/CS reference SoC, and in an opposite case, an HEV mode may be determined as a representative driving mode.

Through the aforementioned representative driving mode determination method, when a representative driving mode is clearly determined using a mode prediction index based on required power, a gear shift map appropriate for the representative driving mode may be applied, and when the representative driving mode is not clearly determined, a gear shift map appropriate for a representative driving mode based on a SoC is applied, and thus, optimum gear shift may be possible in a situation such as high-load driving in a CD mode or low-load driving in a CS mode.

Figure 7:
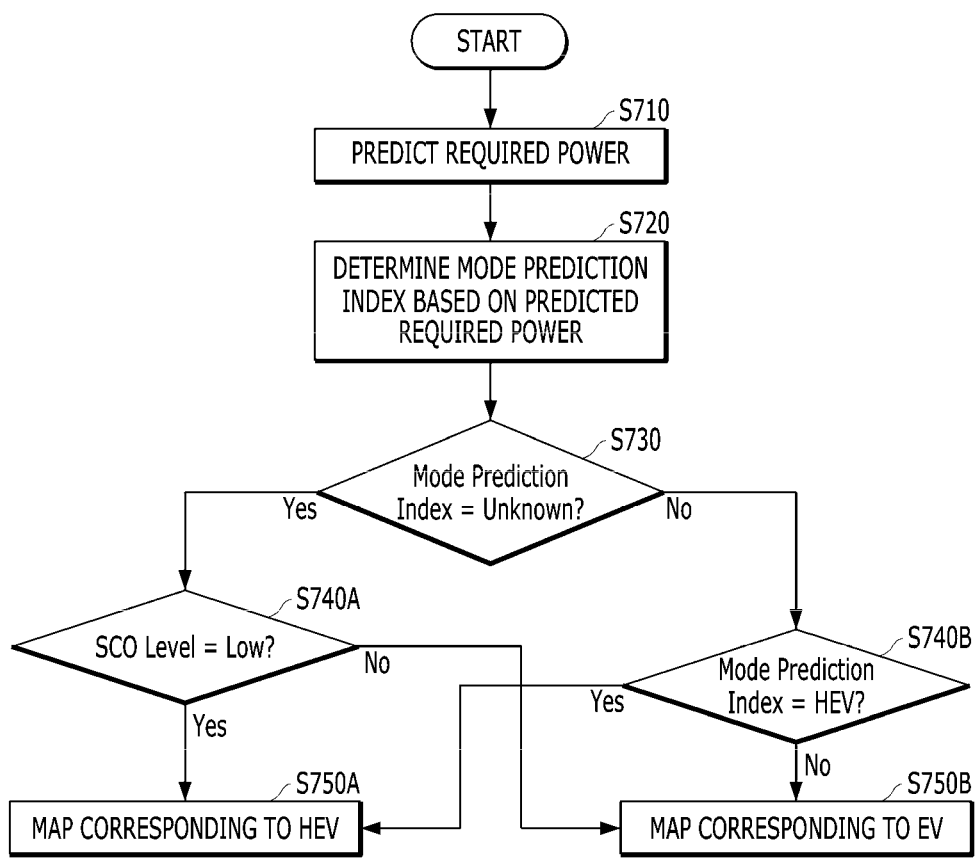
FIG. 7 is a diagram of an example of a gear shift map determination procedure according to an embodiment of the present disclosure.

The gear shift map determination procedure described as far is summarized as shown in FIG. 7.

FIG. 7 is a diagram of an example of a gear shift map determination procedure according to an embodiment of the present disclosure.

Referring to FIG. 7, first, the HCU 240 may predict required power with respect to a current driving period or a forward driving period at S710. The aforementioned dynamics-based prediction or statistics-based prediction may be applied to prediction of required power, and in some embodiments, both the two methods may also be used.

When the required power is predicted, a mode prediction index may be determined through an amplitude difference with mode switch power or possibility distribution at S720.

The determined mode prediction index may be inserted into a representative driving mode determination reference as shown in FIG. 6C.

When the determined mode prediction index corresponds to an unclear range (YES at S730), a representative driving mode may be determined as a SoC state of a battery at S740A. For example, when a SoC is less than a "Low" state, that is, a CD/CS reference SoC, a gear shift map corresponding to the HEV mode may be determined to the applied at S750A, and otherwise, a gear shift map corresponding to the EV mode may be determined to the applied at S750B.

In contrast, when the mode prediction index does not correspond to an unclear range (NO at S730) and corresponds to the HEV mode (YES at S740B), a gear shift map corresponding to the HEV mode may be determined to be applied at S750A, and when the mode prediction index corresponds to the EV mode (NO at S740B), a gear shift map corresponding to the EV mode may be determined to be applied at S750B.

The aforementioned determination result of a gear shift map may be output in the form recognizable by a driver. In detail, the hybrid vehicle according to an embodiment may include a display of a cluster, a head unit, or an audio/video/navigation (AVN) system, or a display device of a head up display (HUD). When receiving a signal about the transmission map determined from the hybrid controller, the display device may display corresponding information, which will be described with reference to FIG. 7.

Figure 8:
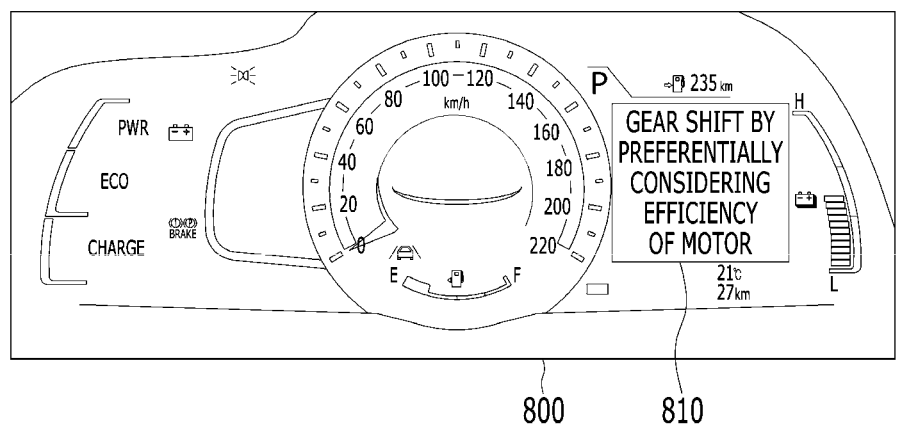
FIG. 8 is a diagram showing the form in which starting control is performed according to an embodiment of the present disclosure.

FIG. 8 is a diagram showing the form in which starting control is performed according to an embodiment of the present disclosure.

Referring to FIG. 8, a hybrid vehicle according to an embodiment may output a determination result of a gear shift map in one region 810 of a cluster 800, in which text display is allowed.

Needless to say, such a display form is exemplary, and the text may be replaced with a warning light that blinks at a fixed position, or may be displayed in the form of an icon.

In addition, a displayed position as well as the display form may also be changed to another position in a cluster, or changed to a display of an AVN system or a head unit, or a head up display.

The hybrid vehicle related to at least one embodiment of the present disclosure as configured above may select a more effective gear shift map.

In particular, according to the present disclosure, a gear shift map may be selected in consideration of a ratio of driving mode accompanied by engine driving through prediction of required power, and thus, an actual driving source during traveling and a gear shift map may be matched with each other, thereby enhancing efficiency.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

The invention claimed is:

1. A method of controlling gear shift of a hybrid vehicle, the method comprising:
   predicting, via a hybrid controller, required power of a forward driving path;
   determining a representative driving mode based on mode switch power as a reference of switch between a first driving mode using only an electric motor and a second driving mode using at least an engine and the predicted required power; and
   applying, via a transmission controller, any one of a first gear shift map corresponding to the first driving mode or a second gear shift map corresponding to the second driving mode based on the representative driving mode determined by the hybrid controller.

2. The method of claim 1, wherein the determining the representative driving mode includes:
   determining a mode prediction index based on the mode switch power and the predicted required power; and
   determining the representative driving mode based on the mode prediction index.

3. The method of claim 2, wherein the determining the representative driving mode based on the mode prediction index is performed with reference to a representative driving mode determination reference for dividing the mode prediction index into a plurality of ranges.

4. The method of claim 3, wherein the plurality of ranges includes a first range corresponding to the first driving mode, a second corresponding to the second driving mode, and a third range corresponding to differences between a first range and a second range.

5. The method of claim 4, wherein, when the determined mode prediction index corresponds to the third range, the applying includes applying the first gear shift map or the second gear shift map based on a state of charge (SoC) of a battery for supplying power to the electric motor.

6. The method of claim 5, wherein the applying includes;
   applying the first gear shift map when the SoC is equal to or greater than a preset reference; and
   applying the second gear shift map when the SoC is less than the preset reference.

7. The method of claim 6, wherein the preset reference corresponds to a reference of switch between a charge depleting (CD) mode and a charge sustaining (CS) mode.

8. The method of claim 2, wherein the predicting the required power includes at least one of:
   predicting first required power based on at least one of a weight of the hybrid vehicle, a slope of a driving path, or an average vehicle speed; or
   predicting second required power based on required power information accumulated and collected on a similar path to the driving path.

9. The method of claim 8, wherein the determining the mode prediction index based on the mode switch power and the predicted required power includes:
   determining the mode prediction index based on a difference between the first required power and the mode switch power; or
   determining the mode prediction index based on a possibility that the second required power is greater than the mode switch power.

10. A non-transitory computer-readable recording medium having recorded thereon a program for executing the method of claim 1.

11. A hybrid vehicle comprising:
    a hybrid controller configured to predict required power of a forward driving path, to determine a representative driving mode based on mode switch power as a reference of switch between a first driving mode using only an electric motor and a second driving mode using at least an engine and the predicted required power, and to determine whether any one of a first gear shift map corresponding to the first driving mode or a second gear shift map corresponding to the second driving mode is applied based on the determined representative driving mode; and
    a transmission controller configured to apply a gear shift map determined among the first gear shift map and the second gear shift map to be applied by the hybrid controller.

12. The hybrid vehicle of claim 11, wherein the hybrid controller determines a mode prediction index based on the mode switch power and the predicted required power and determines the representative driving mode based on the mode prediction index.

13. The hybrid vehicle of claim 12, wherein the hybrid controller determines the representative driving mode with reference to a representative driving mode determination reference for dividing the mode prediction index into a plurality of ranges.

14. The hybrid vehicle of claim 13, wherein the plurality of ranges includes a first range corresponding to the first driving mode, a second corresponding to the second driving mode, and a third range corresponding to differences between the first range and the second range.

15. The hybrid vehicle of claim 14, wherein, when the determined mode prediction index corresponds to the third range, the hybrid controller determines to apply the first gear shift map or the second gear shift map based on a state of charge (SoC) of a battery for supplying power to the electric motor.

16. The hybrid vehicle of claim 15, wherein the hybrid controller determines to apply the first gear shift map when the SoC is equal to or greater than a preset reference and determines to apply the second gear shift map when the SoC is less than the preset reference.

17. The hybrid vehicle of claim 16, wherein the preset reference corresponds to a reference of switch between a charge depleting (CD) mode and a charge sustaining (CS) mode.

18. The hybrid vehicle of claim 12, wherein the hybrid controller predicts first required power based on at least one of a weight of the hybrid vehicle, a slope of the driving path, or an average vehicle speed, or predicts second required power based on required power information accumulated and collected on a similar path to the driving path.

19. The hybrid vehicle of claim 18, wherein the hybrid controller determines the mode prediction index based on a difference between the first required power and the mode switch power, or determines the mode prediction index based on a possibility that the second required power is greater than the mode switch power.

\* \* \* \* \*